Figure 1:
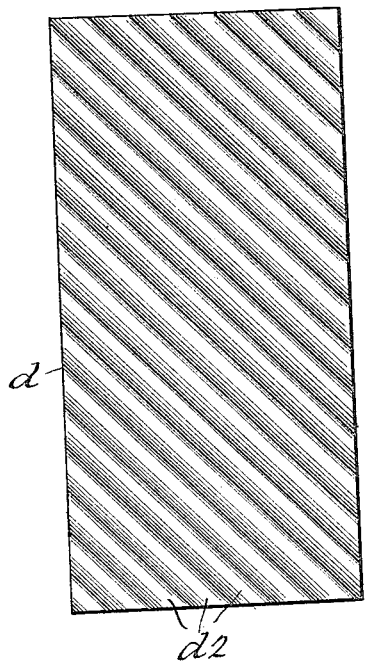

F. N. HOLMQUIST.
CORRUGATED PIPE.
APPLICATION FILED MAY 20, 1914.

1,140,981.

Patented May 25, 1915.

WITNESSES

INVENTOR
Fred N. Holmquist
BY
ATTORNEYS

UNITED STATES PATENT OFFICE.

FRED N. HOLMQUIST, OF WELDON, ILLINOIS.

CORRUGATED PIPE.

1,140,981.

Specification of Letters Patent.

Patented May 25, 1915.

Application filed May 20, 1914. Serial No. 839,789.

*To all whom it may concern:*

Be it known that I, FRED N. HOLMQUIST, a citizen of the United States, and resident of Weldon, in the county of Dewitt and State of Illinois, have invented certain new and useful Improvements in Corrugated Pipe, of which the following is a specification.

My invention relates to the formation of pipe, and also to the joining of separate members thereof, and the main object thereof is to provide a pipe formed of sheet metal previously corrugated diagonally.

A further object is to corrugate the sheets of metal so that the pitch of the corrugations, or the width thereof, will be such as to have the corrugations at the overlapping edges of the sheet register and thus form continuing spirals in the completed pipe.

A further object is to form the pipe section ends of slightly different diameters whereby one section may be screwed into another section and be thereby held together even though no rivets be used.

This style of pipe may be used for any desired purpose, such as culverts, pipe lines, etc., and it possesses all the advantages of the ordinary corrugated pipe, such as great strength, considering the small amount of material used, ease of installing, etc. A larger and more uniform cross section of the open area can be secured than with the ordinary corrugated pipe; the corrugations will impart a whirling motion to the water which will keep dirt and other foreign matter in suspension, or keep it moving down stream, resulting in the pipe being kept clean; no special devices, such as coupling bands, are needed to join separate lengths, and a relatively light, strong, and comparatively inexpensive pipe results.

My invention is fully set forth in the following specification, of which the accompanying drawings form a part, in which the same reference characters are used to designate the same parts in each of the views, and in which:—

Figure 2:
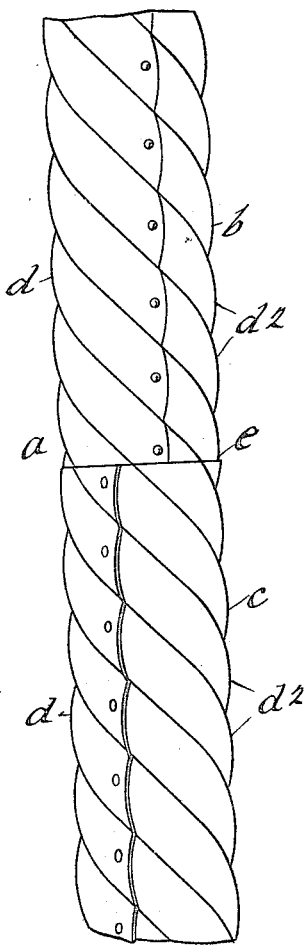
Figure 3:
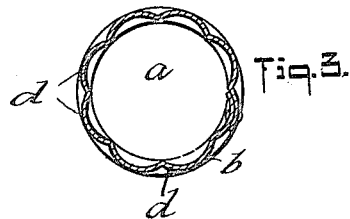
Figure 4:
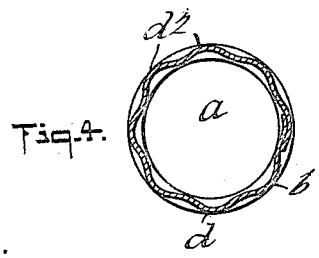

Figure 1 is a plan view of a sheet of metal corrugated for the pipe formation; Fig. 2 is a view of two complete pipe sections joined together by the spirals; Fig. 3 is a section of the pipe and showing one form of corrugation; and Fig. 4 is a similar view, showing another form of corrugation.

In the drawings forming a part of this application I have shown a pipe $a$ formed of sections $b$ and $c$ and each section being formed of a sheet $d$ of metal provided with corrugations $d^2$ and then rolled into cylindrical form in such manner that the edges of said sheet will overlap sufficiently to be riveted or otherwise secured together, the corrugations of one edge fitting those of the opposite ends whereby a spiral arrangement of the corrugations results, as clearly shown, thus producing a very strong, though light, pipe which is very inexpensive and has all the advantages of the ordinary corrugated pipes, and of cylindrical, sheet iron pipes, and also many additional advantages thereover.

In riveting the sheet edges together to form the pipe sections, I prefer to slightly enlarge the diameter of one end thereof over the diameter of the opposite end, whereby one end of a section may be inserted into the enlarged end of another section and, because of the complemental spirals in the two sections, be screwed thereinto and thus hold said sections in detachable connection, and forming a pipe line of continuous spiral formation, this being clearly shown at $e$, Fig. 2, but I may, if desired, also rivet said sections together where a permanent pipe line is being installed.

The length of the sheet $d$ is arbitrary, but the width thereof is gaged by the desired diameter of the completed pipe, and the pitch of the corrugations, and resulting spirals, also depends on the diameter of the completed pipe, although I prefer to form the corrugations at an angle of 45 degrees, as shown, this, however, requiring a variation of the width of the corrugations for relatively slight differences in the pipe diameters for, as will be seen, with the pitch and width of the corrugations shown, the pipe diameters possible thereto are only such as will permit the corrugations at one sheet edge to fit into those of the other sheet edge, the variation of pipe diameters being, therefore, dependent upon the width of a corrugation taken on a line at right angles to the sheet edge, or in other words, the distance across one corrugation in a plane through the pipe section at right angles to the axial line of the pipe, but if the pitch of the corrugations or the width thereof be altered, the pipe diameter will be correspondingly affected. Although not shown, I may also form elbows in the same manner, by so forming the corrugations as to converge from the central longitudinal line of the sheet of metal toward both edges thereof, whereby the corrugations of reduced width at said edges would fit each other when the elbow was formed, and many other forms of the pipe line may be found to be within the scope of my invention.

Having fully described my invention, what I claim as new, and desire to secure by Letters Patent, is:—

1. The method of forming a pipe, comprising corrugating a metal sheet at a predetermined angle to the edges thereof, bending said metal sheet into a cylinder, overlapping the side edges thereof and riveting said edges, the corrugation ends of one side of said sheet being brought into register with those of the other side of said sheet, whereby continuing spirals result.

2. The method of forming a pipe, comprising corrugating a metal sheet at a predermined angle to the edges thereof, bending said sheet into a cylinder with the edges overlapping, and more at one end of the pipe than at the other to reduce the diameter at said end accordingly, and riveting said overlapping edges, the corrugations at the overlapping edges being brought into register.

3. The method of forming a pipe, consisting of corrugating a metal sheet at a predetermined inclination to the edges thereof, bending said metal sheet into a cylinder, overlapping the side edges thereof, the corrugated ends of one side of said sheet being brought into register with those of the other side of said sheet, whereby continuing spirals result, riveting said edges, and forming said corrugations of a width, from crest to crest, for a given pitch, to form a pipe of a desired diameter.

4. The method of forming a pipe, consisting of corrugating a metal sheet with the corrugations of a predetermined width, from crest to crest, at an inclination to the edges thereof, bending said metal sheet into a cylinder, overlapping the side edges thereof, the corrugated ends of one side of said sheet being brought into register with those of the other side of said sheet, whereby continuing spirals result, riveting said edges, and forming said corrugations at such inclination to the axis of the completed pipe as to produce a desired diameter.

5. The method herein described of making a sheet metal pipe which consists in forming in the metal sheet a series of parallel corrugations in close relation and extending diagonally to the direction of length of the sheet and from side to side thereof, and bending the sheet into cylindrical form with the edges overlapping and with the corrugations of the meeting edges registering, thereby spirally threading the pipe, substantially as set forth.

6. The method herein described of making a sheet metal pipe which consists in forming in the metal sheet a series of parallel corrugations in close relation and extending diagonally to the direction of length of the sheet and from side to side thereof, bending the sheet into cylindrical form with the edges overlapping and with the corrugations of the meeting edges registering, thereby forming a continuous spiral throughout the length of the pipe, and finally securing the edges of the sheet together, the overlapping of the meeting edges and the bringing of the meeting corrugations into true registration operating as a gage in securing the desired diameter of pipe, all substantially as set forth.

7. The method herein described of making a sheet metal pipe which consists in forming in the metal sheet throughout its length a series of parallel corrugations in close relation and extending diagonally to the length of the sheet and from side to side thereof, bending the sheet into cylindrical form with the edges overlapping and with the corrugations of the meeting edges registering, thereby forming a continuous spiral throughout the length of the pipe, the overlapping of the meeting edges and the bringing of the meeting corrugations into true registration operating as a gage in securing the desired diameter of pipe, and varying the extent of overlap at the end of the pipe for varying its diameter at such point, substantially as set forth.

In testimony that I claim the foregoing as my invention I have signed my name in presence of the subscribing witnesses.

FRED N. HOLMQUIST.

Witnesses:
H. M. CASSIDY,
F. A. BUSH.

Copies of this patent may be obtained for five cents each, by addressing the "Commissioner of Patents, Washington, D. C."